(No Model.)  7 Sheets—Sheet 1.

C. W. SLEEPER.
CAN FORMING AND SOLDERING MACHINE.

No. 429,872.  Patented June 10, 1890.

Fig. 1.

WITNESSES:  INVENTOR.

(No Model.) 7 Sheets—Sheet 2.
C. W. SLEEPER.
CAN FORMING AND SOLDERING MACHINE.

No. 429,872. Patented June 10, 1890.

Fig. 2.

WITNESSES:

INVENTOR
Charles W. Sleeper.

(No Model.) 7 Sheets—Sheet 3.
C. W. SLEEPER.
CAN FORMING AND SOLDERING MACHINE.
No. 429,872. Patented June 10, 1890.

Fig. 3.

WITNESSES:
Allan Moyl
Wm H Ward

INVENTOR
Charles W. Sleeper.

(No Model.) 7 Sheets—Sheet 4.

C. W. SLEEPER.
CAN FORMING AND SOLDERING MACHINE.

No. 429,872. Patented June 10, 1890.

WITNESSES:
Allan Moyle
Wm H Ward

INVENTOR
Charles W. Sleeper (No Model.) 7 Sheets—Sheet 5.

C. W. SLEEPER.
CAN FORMING AND SOLDERING MACHINE.

No. 429,872. Patented June 10, 1890.

WITNESSES:
Allan Moyle
Wm H Ward

INVENTOR
Charles W. Sleeper (No Model.) 7 Sheets—Sheet 6.
C. W. SLEEPER.
CAN FORMING AND SOLDERING MACHINE.

No. 429,872. Patented June 10, 1890.

WITNESSES: INVENTOR.
Allan Moyle Charles W. Sleeper.
Wm H Ward

(No Model.) 7 Sheets—Sheet 7.
C. W. SLEEPER.
CAN FORMING AND SOLDERING MACHINE.

No. 429,872. Patented June 10, 1890.

WITNESSES:
William Martin
Allan Moyle

INVENTOR.
Charles W. Sleeper,

UNITED STATES PATENT OFFICE.

CHARLES W. SLEEPER, OF ISLAND POND, VERMONT.

CAN FORMING AND SOLDERING MACHINE.

SPECIFICATION forming part of Letters Patent No. 429,872, dated June 10, 1890.

Application filed January 28, 1889. Serial No. 297,876. (No model.)

*To all whom it may concern:*

Be it known that I, CHARLES W. SLEEPER, a citizen of the United States, residing at Island Pond, in the county of Essex and State of Vermont, have invented a new and useful Machine for Seaming and Forming the Bodies of Tin Cans, of which the following is a specification.

My invention relates to improvements in seaming-machines in which the can-bodies are automatically formed about a cylinder or series of cylinders supplied with solder and flux and automatically soldered.

The objects of my invention are, first, to prepare the edges of can-bodies for soldering by rolling them smooth and to proper shape and coating them with a liquid flux; second, to provide means for feeding each can-body to one of a series of forming devices; third, to provide means for forming the can-bodies about an adjustable cylinder, leaving the overlapping edge exposed, so that it may be soldered; fourth, to deposit a quantity of powdered resin upon the overlapping edge or seam of the can-body; fifth, to carry the can-body from point to point through the several operations; sixth, to deposit the required amount of solder upon the seam; seventh, to solder the seam; eighth, to expel the finished can-body from the machine. I accomplish these objects and provide means for automatically operating the several devices by means of the mechanism illustrated in the accompanying drawings, in which similar letters and figures refer to similar parts throughout the several views.

My invention consists in the combination of a device for feeding sheets of tin, a device for feeding and cutting solder, a carrying-wheel, and a forming device, (for each of which I have made separate application for patents in the United States,) with a resin-feed, soldering-irons, and means for supporting and automatically operating the several devices, described in detail, as follows:

The device for feeding sheets of tin for which I obtained a patent, No. 393,082, November 20, 1888, and which will be referred to hereinafter as the "tin-feed," is constructed as follows: A bed $a$ is provided with slots 1 1 and two adjustable sides $a'$ $a^2$, adjustably secured to the bed $a$ by suitable bolts fitted to the slots 1 1. Two guides $a^3$ $a^3$, secured to the bed $a$, serve as ways for a sliding block $a^4$, which carries a cross-bar $a^5$, the ends of which are forked, so as to grasp and push the tin forward. Two rests $a^6$ $a^6$ serve to support the tin, and two sets of guides $a^7$ $a^8$ guide the tin while it is being put into position to be fed forward. Two rollers $a^9$ $a^{10}$ serve to crimp the end of the sheet that is to be the overlapping edge of the seam, and at the same time roll the said edge smooth. Two rollers $a^{11}$ $a^{11}$ serve to roll the edge that is to be the under edge of the seam smooth and flat. A guide $a^{12}$ guides the tin below the cylinder of the forming device and is secured to the tin-table $a^{13}$. The tin-table $a^{13}$ is used to hold the sheets of tin, and is supported by two uprights $a^{14}$ $a^{14}$. A fluxing device $a^{15}$ is secured to the side $a'$ in such manner that the crimped edge of the tin shall pass through it in its forward motion and receive a coating of liquid flux, which is fed to the fluxing device $a^{15}$, through the tube $a^{16}$, from an ordinary sight-feed lubricator $a^{17}$.

As means for operating the tin-feed I have provided teeth upon the under side of the sliding block $a^4$ to engage with two gears $a^{18}$ $a^{18}$, the axles of which work in suitable bearings secured to the bed $a$. A rack $a^{19}$, held in position by two guides $a^{24}$ $a^{24}$, engages with two pinions $a^{23}$ $a^{23}$, which are secured to the gears $a^{18}$ $a^{18}$. The effect of the motion imparted by the rack $a^{19}$ to the pinions $a^{23}$ $a^{23}$ is to cause the sliding block $a^4$ to move in the guides $a^3$ from one of the gears $a^{18}$ to the other, the motion of the sliding block being greater than the motion of the rack $a^{19}$ in proportion as the gear $a^{18}$ is to the pinions $a^{23}$. A roller 2 is secured to the rack $a^{19}$ and works in a slot in the lever $a^{20}$, which lever is pivoted upon the bolt 3 to the arm or bracket $a^{21}$, which is secured to the frame A of the machine. The lower end of the lever $a^{20}$ carries a roller which works in the grooved cam $a^{22}$ upon the shaft $A^5$. I have also provided a bracket $a^{25}$, to which the bed $a$ is secured. The bracket $a^{25}$ is secured to the frame by suitable bolts 4 4 4 4, which pass through slots in the said bracket. The bracket $a^{25}$ is raised and lowered by means of the screw 5, and secured in such position that the tin as it leaves the feeding device will enter the forming device properly.

Figure 2:
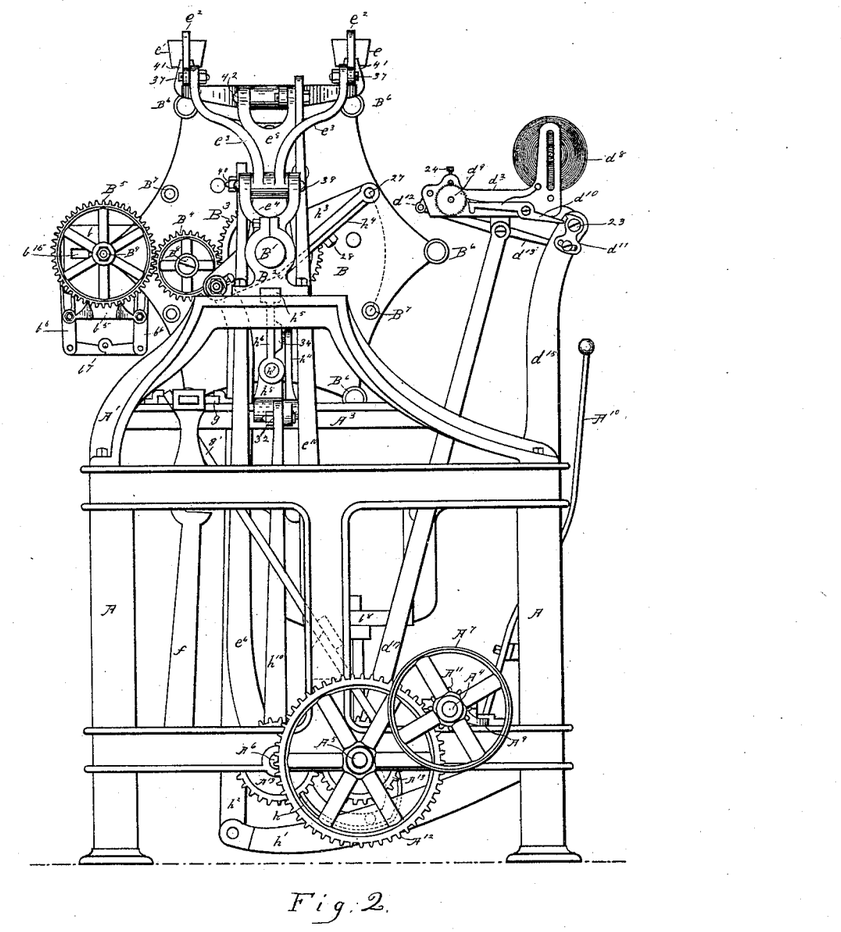
Fig. 2 is a rear elevation of machine, showing only such parts as necessary to explain the working of machine.

The forming device for which I have made separate application for a patent, No. 295,454, dated January 4, 1889, is best shown in Figs. 9, 10, 11, and 12, and is described as follows: A work-plate $b$, secured to the gear $B^5$ of carrying-wheel by a bolt $B^9$, is provided with a slot 6, fitted to a projection upon the hub of the gear $B^5$. Two rectangular slots $b^{15}$ (one of which is shown in Fig. 2) are provided to allow a suitable fork or ejector to pass through the work-plate $a$ to push the finished can-body off from the cylinder. The cylinder $b'$ is secured to the work-plate $b$ by the bolt $B^9$, and is provided with two slots 7 7, and is slightly flattened on its lower side. A bracket $b^2$, supporting two clamps $b^3$ $b^4$, is secured to the work-plate $b$ by suitable screws. The clamps $b^3$ $b^4$ act to form the can-body (a sheet of tin cut to size to form the body of a can) about the cylinder.

To adjust the size of cans, I have provided a false piece 8, fitted to the cylinder $b'$, and an auxiliary piece 9, fitted loosely to the bracket $b^2$ and held upward by a spring 10. The diameter of the can is increased by inserting pieces of metal between the piece 8 and the cylinder $b'$.

A bracket $b^5$ supports two locking-arms $b^6$ $b^6$, pivoted upon the screws 11 11 and connected by the toggle-joint $b^7$. The arms $b^6$ $b^6$ are provided with grooves or slots 12, Fig. 11, and the ears 13 of the clamps $b^3$ $b^4$ are provided with studs 14, carrying rollers which work in the slots 12 of the locking-arms. The clamps $b^3$ $b^4$ are closed about the cylinder $b'$ by the forked piece $b^8$, which in rising to the position shown by corresponding dotted lines strikes the clamps $b^3$ $b^4$ and carries them up and forces them about the cylinder, the rollers 15 and 16 working against the clamps. The clamp $b^4$ is closed first as the roller 16 passes closer to the cylinder than the roller 15. The clamp $b^3$ is finally closed by the projection $b^9$ striking the pin 17 of the toggle-joint $b^7$ and forcing it up past its center. The yoke $b^8$ immediately descends after closing the clamps to allow the wheel to make its motion. The studs 18 18 and block 19, which act as guides to the fork $b^8$, are secured to and made a part of the frame A.

To automatically operate the forming device, I have provided a bracket $b^{10}$, which is secured to the frame A and serves as a support for one end of a lever $b^{11}$, the other end being connected to the fork $b^8$ by the connecting-rod $b^{12}$. The lever $b^{11}$ is moved by an arm $b^{13}$, (upon the shaft $A^6$,) carrying a roller $b^{14}$, which at each revolution of the shaft $A^6$ strikes the lever $b^{11}$ and moves it to the position shown by corresponding dotted lines.

The resin-feed (best shown in Figs. 1 and 19) is described as follows: $c$ is a box or hopper to hold a quantity of powdered resin. A corrugated roll $c'$ passes through the lower part of the resin-box $c$. Upon one end of the roll $c'$ is a ratchet $c^2$. An arm $c^3$ carries a pawl $c^4$ to engage with the ratchet $c^2$ and a roller $c^5$, the arm $c^3$ being fitted loosely to the end of the roll $c'$ in such a manner that its weight shall cause it to fall to the position shown in Fig. 1. Two adjusting pieces $c^6$ $c^7$ are secured to the sides of the resin-box $c$ by suitable screws, which pass through slots in the said adjusting-pieces. The resin-box $c$ is secured to the arm $c^8$. An arm $c^9$ is clamped to the stationary shaft $B'$ and serves as a bearing for a rock-shaft $c^{10}$, upon which the arms $c^8$ and $c^{11}$ are placed. A cam $c^{12}$, similar in shape to cam $f^3$, acts upon the arm $c^{11}$ by means of the cam-rod $c^{13}$, causing the resin-box to rise and fall as required. As the resin-box descends, the roller $c^5$ strikes the flange or back of the tin-table $a^{13}$, and the pawl $c^4$, engaging with the ratchet $c^2$, causes the roller $c'$ to rotate within the resin-box $c$ and by rotating to carry a little resin between the adjusting-piece $c^7$ and the roll $c'$, the amount of resin fed being determined by the space between them. The piece $c^6$ is set to scrape off any resin that may adhere to the roll $c'$. The resin thus fed drops through the opening 25, which is made to coincide with the opening between the edges of the clamps of the forming device.

The carrying-wheel, for which I have made separate application for a patent, Serial No. 270,996, dated April 17, 1888, is described as follows, Figs. 2, 3, and 4: The wheel or flange B is fitted loosely to a stationary shaft B′, and is provided with a number of hubs or bosses B⁶ equidistant from each other and from the shaft B′. The wheel B is also provided with bosses B⁷, placed at equal distances from each other and from the shaft B′. The drawings show six each of these bosses; but any number may be used, if required. A gear B³ is keyed to the shaft B′. Gears B⁵ are fitted loosely to each of the bosses B⁶, the hubs 26 of the said gears, Fig. 10, being of sufficient length to pass through the bosses B⁶, and are bored through their centers to receive the bolts B⁹, by which the forming devices are secured to the said gears. The hubs B⁶ are provided with projections which fit the slots or recesses 6 in the work-plate b of forming device and prevent the said work-plates from turning upon the bolt B⁹. Intermediate gears B⁴ upon the studs B⁸ (which project from the face of the wheel B) connect each of the gears B⁵ with the stationary gear B³. The wheel B has an intermittent motion about the shaft B′, each step of the said motion being equal to a complete revolution divided by the number of bosses B⁶. The gears B³ and B⁵ are of the same pitch and diameter, and, as the gear B³ is keyed to the stationary shaft B′ and does not revolve, it follows that the gears B⁵ do not rotate upon their axis, but revolve about a common center without changing their position in relation to the horizon, carrying the series of forming devices which are secured to each of the gears B⁵.

To support and operate the carrying-wheel I have provided the following mechanism, viz: The shaft B′ rests in two clamp-boxes B² B², which are secured to the standards A′ A², which are bolted to the frame A. The standard A² is provided with a horizontal bar or girt A³. A cam h, upon the shaft A⁵ gives motion to a lever h′, which is provided with a roller to work in the said cam. The lever h′ is pivoted to a bracket 45, which is secured to the frame A. A connecting-rod h² connects the lever h′ with an oscillating arm h³ upon the shaft B′. A pin 27 is fitted loosely to the extremity of the arm h³. One end of the pin 27 is fitted to the hubs, projections, or bosses B⁷, which are bored to receive the said pin. The motion of the arm h³ is adjusted to carry the pin 27 back and forth through the arc 27 B⁷, stopping an instant at each extremity of the arc. The pin 27 has a groove across it to receive the end of a lever h⁴, Fig. 4, which is secured to the arm h³ by a bolt 28.

The lever h⁴ is operated by a slide h⁵, resting upon the standards A′ A² and guided by rectangular grooves in the boxes B² B², the said slide being provided with two projections or fingers 29 30, which grasp the ball-shaped end 31 of the lever h⁴. A block h⁶ is secured to the slide h⁵ by suitable screws, and is provided with a latch-pin h⁷, which is made fast to the said block and passes loosely through the guide h⁸. The end of latch-pin h⁷ is turned to fit the holes in projections B⁷. The slide h⁵ and latch-pin h⁷ are given an alternating backward and forward motion by the cam h⁹, which acts upon a roller in the cam-rod h¹⁰, which is attached to the arm h¹¹ by the stud 32. The arm h¹¹ works upon a stud 33, and is provided with a roller that is grasped between the projections 34 35 of the block h⁶.

In operation, the arm h³ being in the position shown in Fig. 2, the slide h⁵ and latch-pin h⁷ move forward, the latch-pin h⁷ entering one of the projections B⁷, and thus locking the wheel B in position. At the same time the finger 29 moves the lever h⁴ and causes it to withdraw the pin 27 from the projection B⁷. The arm h³ then moves, carrying the pin 27 through the arc 27 B⁷, when the return motion of the slide h⁵ forces the pin 27 into the projection B⁷, and at the same time withdraws the latch-pin h⁷. The arm h³ in its return motion carries the wheel B with it, the operation being repeated with each revolution of the shafts A⁵ A⁶.

The device for feeding and cutting solder, for which I have made separate application for a patent September 5, 1888, Serial No. 284,604, and which will be called the "solder-feed" when referred to hereinafter, is best shown in Figs. 1, 2, 3, and 18, and is described as follows:

To a bed-piece d is secured a knife d′. Two sides d² d² are secured to the bed d. An ear 22 projects from the bed d to receive the end of a connecting-rod, by which the device is given an oscillating motion about the pin 23. The sides d² d² are provided with bearings for the feed-rolls d³ d⁴, the cutting-roll d⁵, and the carrier-roll d⁶. Slots d⁷ are provided to guide a spindle, upon which a roll of sheet or ribbon solder d⁸ is wound. The feed-rolls d³ d⁴, which grasp and feed the solder, are provided with gears 20 21, which engage each other and are operated by the ratchet d⁹ and pawl-carrying lever d¹⁰. An adjustable stop d¹¹ acts upon the lever d¹⁰ at each oscillation of the device and causes the ratchet d⁹ to move. The feed-roll d⁴ is held down by adjusting-screws 24 24. The cutting-roll d⁵ is operated by an arm or crank d¹². A connecting-rod d¹³ connects the arm d¹² with a quadrant d¹⁴, by which the position of the cutting-edge of the cutting-roll d⁵ is adjusted. The oscillating motion of the device causes the cutting-roll d⁵ to move, so as to leave a space between its cutting-edge and the knife d′ as the device rises and to close the space as it descends. The solder is fed between the cutting-edge of roll d⁵ and the knife d′ as the device rises and is cut off and dropped through the opening 47 as the device descends. The standard d¹⁵, to which the solder-feed is secured by the pin 23, is made a part of the frame A.

To automatically operate the solder-feed, I have provided an eccentric d¹⁶ upon the shaft $A^5$ and connected the same to the ear 22 by a rod $d^{17}$ and stop $d^{18}$. The oscillation of the solder-feed should be sufficient to allow the forming devices to pass beneath the same when it is raised to its highest point.

To automatically solder the can-bodies, I have provided two soldering-irons $e\ e'$, of wrought-iron or mild steel of box shape, and to be heated by blowing a flame into them. The soldering-irons are held by arms $e^2$, which are provided with openings or slots 46, through which the faces 36 of the soldering-irons project. The soldering-irons are not fastened to the arms $e^2$, but are simply dropped into the slots 46 in the same, and may be readily removed or changed while hot. The arms $e^2$ are attached to the forked lever $e^3$ by studs 37 37, the lever $e^3$ being provided with slots 38 for adjusting the height of the arms $e^2$. The lever $e^3$ is pivoted upon the pin 39 in a standard $e^4$, which is secured to the shaft $B'$. The soldering-irons are given a reciprocating or rubbing horizontal motion (similar to the motion of the hand in soldering) by a cam $e^5$ upon the shaft $A^6$ acting upon the cam-rod $e^6$, which is provided with a roller to work in the groove in said cam, and is connected to the arm $e^3$ by the stud 40. The arms $e^2$ rest upon the extremities of the forked lever $e^7$, and are guided by the lips 41 upon the same. The lever $e^7$ is pivoted upon the pin 42 in the standard $e^8$, which is secured to the shaft $B'$. The lever $e^7$ acts to automatically raise and lower the soldering-irons at regular intervals, as required, by the motion of the carrying-wheel, and is operated by a cam $e^9$ upon the shaft $A^5$, connected to the lever $e^7$ by the cam-rod $e^{10}$, which is provided with a roller to work in the groove of the said cam and a slot 43 for adjusting the position of the lever $e^7$ by means of the stud 44.

Figures 4, 5, 6, 7, 8, 20:
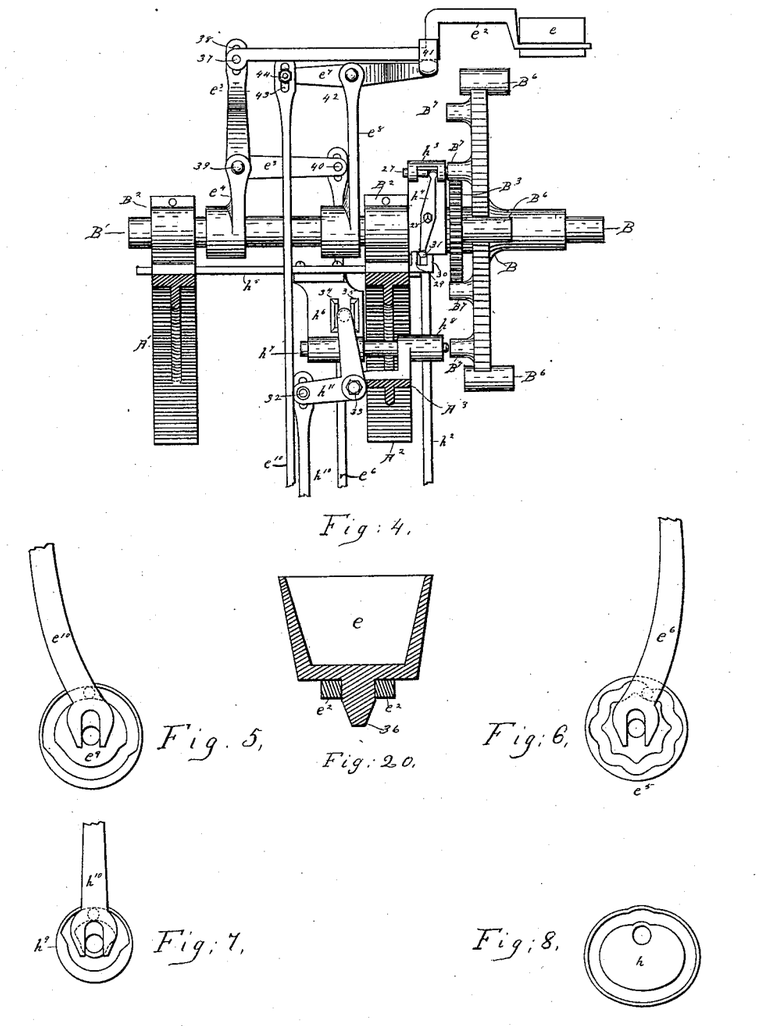
Fig. 4 is a partial side view of machine, showing the manner of operating the carrying-wheel and soldering-irons.
Fig. 5 shows a cam and part of a cam-rod for raising the soldering-irons.
Fig. 6 shows a cam and part of a cam-rod for moving the soldering-irons.
Fig. 7 shows the cam and part of cam-rod which operate the slide $h^5$ and latch-pin $h^7$.
Fig. 8 shows face of the cam for moving the carrying-wheel.
Fig. 20 is a sectional detail of soldering-iron, taken at line $xx$, Fig. 3.
Figures 9, 10, 11, 12:
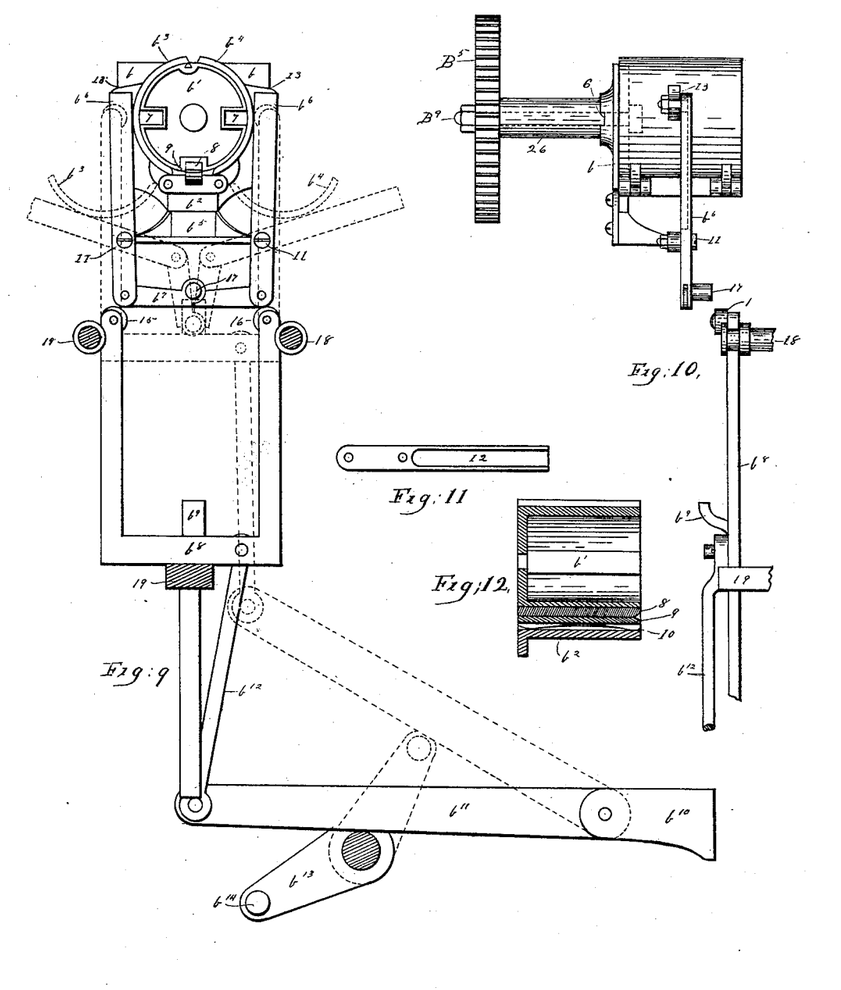
Fig. 9 is an enlarged front elevation of the forming device.
Fig. 10 is an enlarged side elevation of the forming device.
Fig. 11 is a detail of locking-arm.
Fig. 12 is a central longitudinal section of clamp-bracket $b^2$ and cylinder $b'$, showing arrangement of false pieces 8 and 9 and spring 10.
Figures 13, 14, 15, 16:
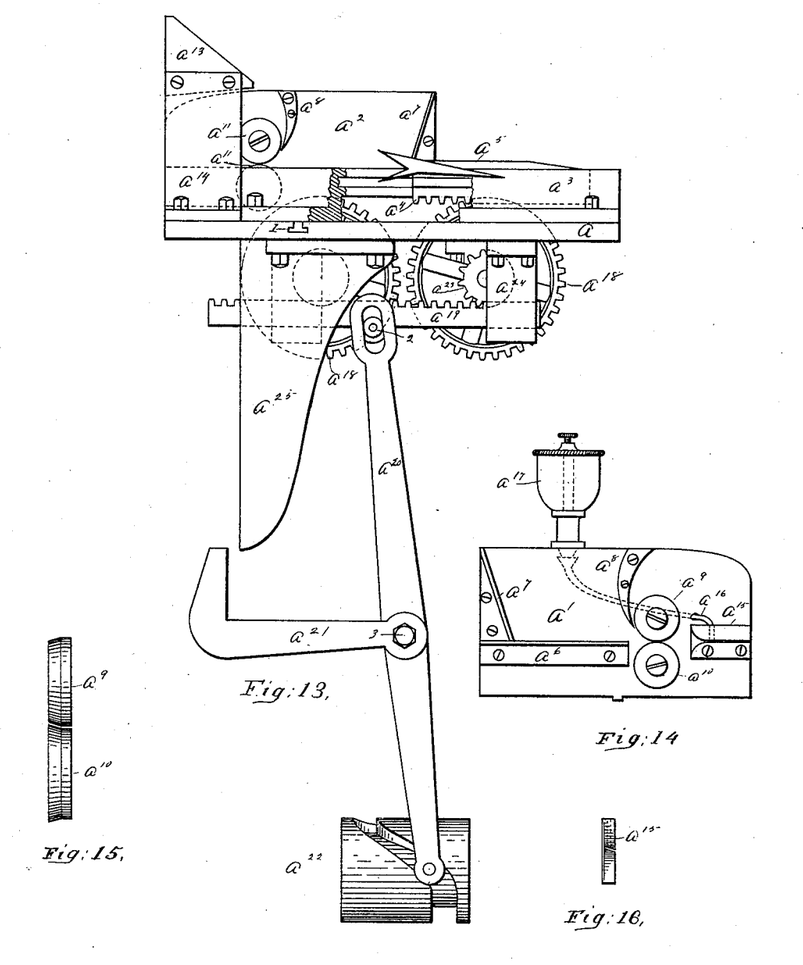
Fig. 13 is an enlarged side elevation of the tin-feed with side $a'$ removed.
Fig. 14 is a detail of side $a'$.
Fig. 15 is an enlarged detail of the crimping-rolls.
Fig. 16 is an enlarged detail of the fluxing device.
Figures 17, 18, 19, 21:
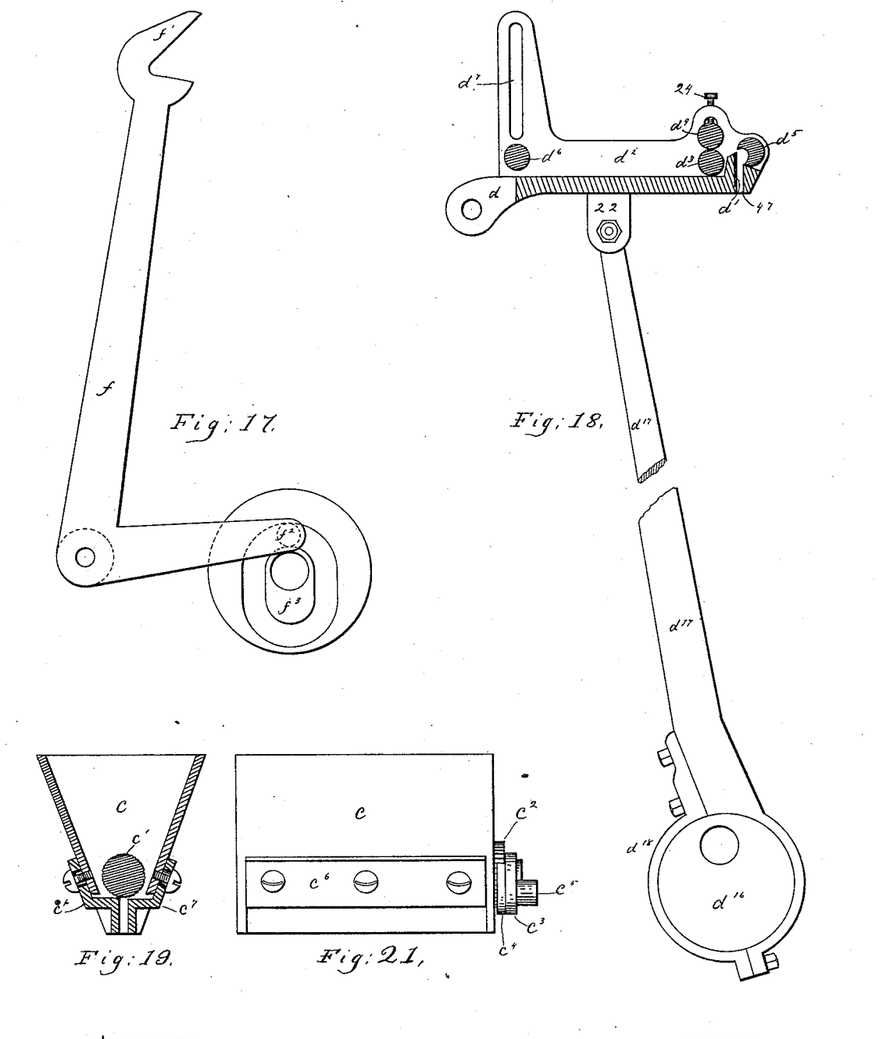
Fig. 17 is a detail of cam and arm for opening the forming device.
Fig. 18 is an enlarged sectional detail of solder-feed, taken at line $xx$, Fig. 3.
Fig. 19 is a sectional detail of resin-feed box, taken at line $xx$, Fig. 3.
Fig. 21 is a side elevation of the resin-feed box.

To automatically open the clamps of the forming devices, I have provided an arm $f$, Figs. 7 and 17, with a finger $f'$ at one extremity, and carrying a roller upon the end $f^2$ to work in the groove of a cam $f^3$ upon the shaft $A^6$. The arm $f$ is supported by a stud $f^4$, which is secured to the frame $A$. At the proper time the cam $f^3$ causes the arm $f$ to move about the stud $f^4$ until the finger $f'$ strikes the pin 17 of the toggle-joint $b^7$ of the forming device and pulls it down, causing the upper ends of the locking-arms to separate and partly open the clamps, in which position the clamps are held until the finished can-body is removed, when the arm $f$ is moved back to its former position and the clamps fall open by their weight.

Figure 1:
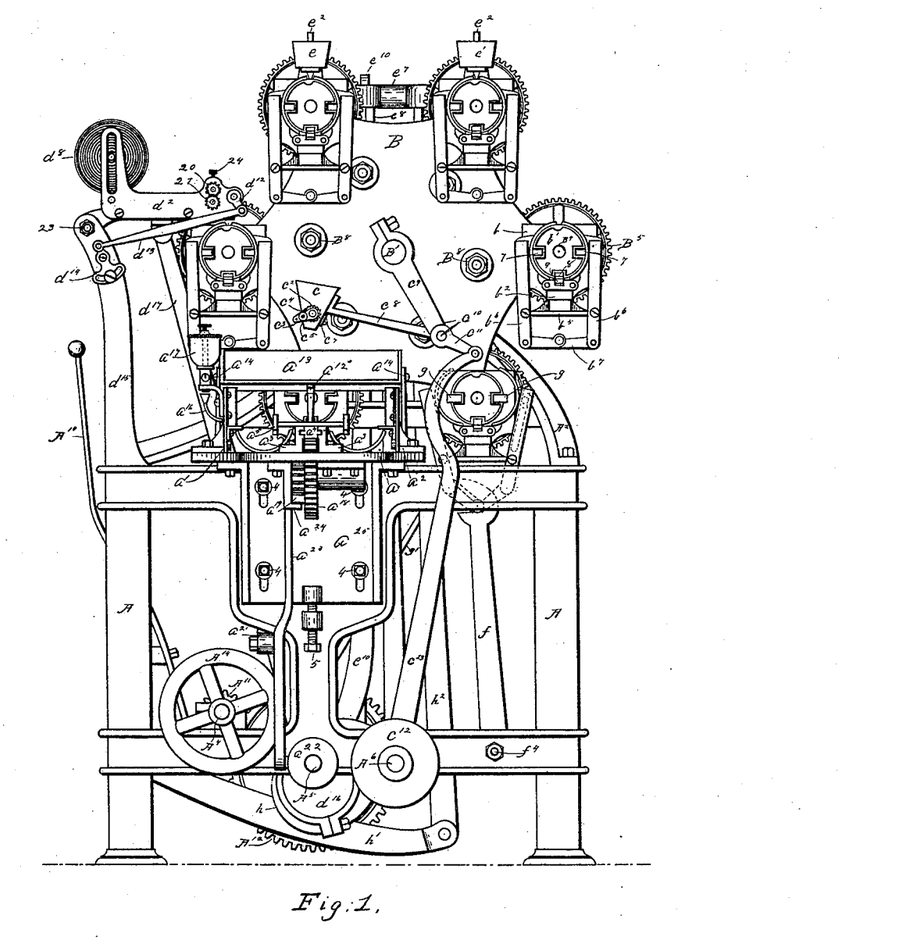
Figure 1 is a front elevation of complete machine.
Figure 3:
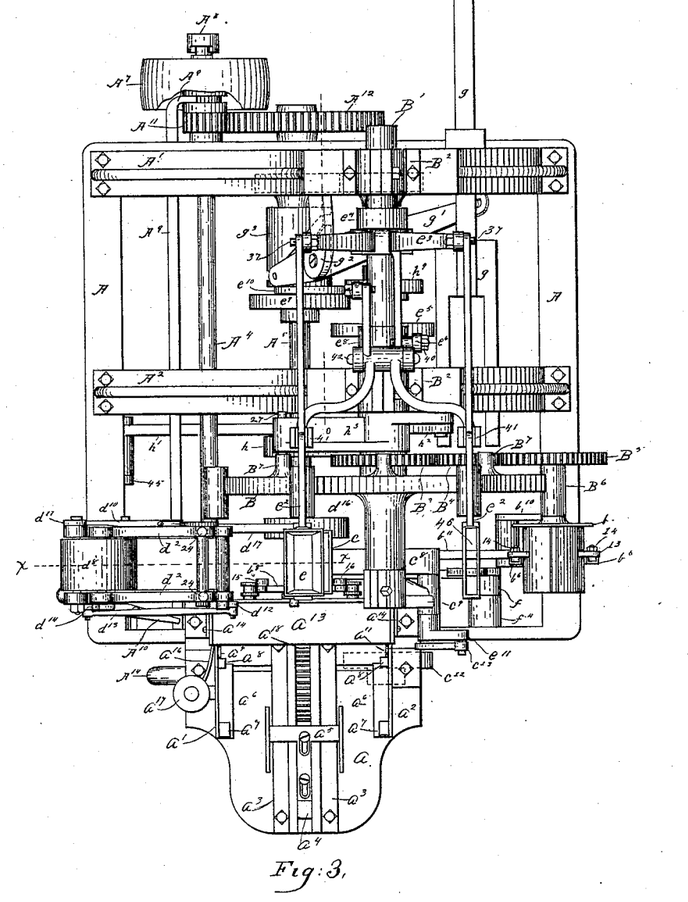
Fig. 3 is a plan of the machine with some of the forming devices removed.

To automatically eject the can-body after it is soldered, I have provided a forked piece or ejector $g$, Figs. 1, 2, and 3, working in suitable guides and moved by a lever $g'$, which is supported by a bracket $g^2$ and acted upon by a cam $g^3$ upon the shaft $A^5$. The motion is so arranged that the instant that the clamps of the forming device begin to open the ejector $g$ moves forward, the forked end passing between the arms of the gear $B^5$ and through the slots $b^{15}\ b^{15}$ of the work-plate and 7 7 of the cylinder, forcing the finished can-body off from the cylinder and returning to its former position in time to allow the carrying-wheel to move.

A rectangular frame $A$ serves to support the several devices, and is provided with suitable bearings for the shafts $A^4$, $A^5$, and $A^6$, of which the shafts $A^5$ and $A^6$ carry the cams necessary to operate the movable parts of the machine.

The machine is driven by a belt to the clutch-pulley $A^7$ upon the shaft $A^4$. The pulley $A^7$ is made to engage with the clutch $A^8$ by the shipper $A^9$, operated by the hand-lever $A^{10}$. A pinion $A^{11}$ upon the shaft $A^4$ engages with a gear $A^{12}$ upon the shaft $A^5$. The shafts $A^5\ A^6$ are geared together by even gears $A^{13}$ $A^{13}$. A hand-wheel $A^{14}$ upon the shaft $A^4$ is provided to operate the machine by hand when adjusting any of the parts.

In operation the can-bodies are placed upon the tin-table $a^{13}$, and from thence they are placed by hand one at a time upon the rests $a^6$ $a^6$. The cross-bar $a^5$ moves the can-body from its position upon the rests $a^6\ a^6$ to the forming device. The ends of the can-body are prepared for soldering as the body moves forward by passing between the rollers $a^9 a^{10}$ and $a^{11}\ a^{11}$ (by which they are rolled smooth and to proper shape) and through the fluxing device, where the end that is to be the overlapping edge of the seam receives a coating of liquid flux. The body is then automatically formed about the adjustable forming-cylinder, the overlapping edge being exposed between the edges of the clamps. The resin-feed descends and deposits a little powdered resin upon the seam and returns to its former position in time to allow the carrying-wheel to turn without striking it. The carrying-wheel makes one motion or step, which brings the forming device with the said can-body beneath the solder-feed, where a strip of solder is cut from the roll of ribbon-solder and deposited upon the seam. The second motion of the carrying-wheel brings the forming device containing the said can-body beneath the soldering-iron $e$, which drops upon the seam and, by imitating as nearly as possible the hand motion of soldering, melts the solder and solders the two edges of the can-body together. The third motion of the carrying-wheel brings the forming device containing the said can-body beneath the second soldering-iron $e'$, where the operation of soldering is repeated. The object of two soldering-irons is to reduce the liability to imperfect work and to increase the capacity of the machine by keeping the seam melted longer than could be done with one soldering-iron. The fifth motion of the carrying-wheel brings the said forming device in position to be operated upon by the finger $f'$ of the arm $f$, which pulls down the toggle-joint $b^7$, and thus partly opens the clamps. The ejector $g$ then slides forward and pushes off the can. The sixth motion of the carrying-wheel brings the forming device in position to receive a second can-body, the clamps falling wide open while the carrying-wheel is in motion.

In the above description I have followed one can-body and one forming device only through a complete revolution of the carrying-wheel. It will be understood, however, that the series of forming devices follow each other, and all the several operations are repeated with each, so that a can-body is formed and soldered at each step of the carrying-wheel.

The forming devices may be removed from the carrying-wheel by removing the bolt $B^9$ and larger or smaller forming devices applied, in which case the sides $a'$ $a^2$ of the tin-feed will require adjusting to the length of the can-body and the whole tin-feed raised or lowered to the proper height to guide the tin to the forming device. The soldering-irons will also require adjusting to position, the slots 38 43 and studs 37 44 being provided for the adjustment.

What I claim as my invention, and desire to secure by Letters Patent, is—

1. In combination with a horizontally-sliding block having a cross-bar extending upward from the same, a horizontal guideway in front of said block and substantially on a plane with its upper surface, a rotary vertical plate or disk situated in front of said block and guideway and journaled on a horizontal axis extending longitudinally with the course of said block, said disk having a series of cylindrical formers or hubs extending from its surface toward the sliding block, means for stopping the rotation of said disk when the lowest portion of the periphery of each former is substantially on a plane with said guideway, and movable pivoted arms for inclosing and clamping the perimeters of each cylindrical former, all as set forth.

2. In combination with the horizontally-sliding block having a longitudinal downwardly-extending rack and the pinions $a^{18}$, journaled below said rack and engaging with the same, pinions $a^{23}$, keyed to the same shafts as pinions $a^{18}$, the rack $a^{19}$, suspended in guideways below pinions $a^{23}$ and engaging with said pinions, the lever $a^{20}$, having one arm attached to the rack $a^{17}$, and means for oscillating said lever, all as set forth.

3. In a seaming-machine, the tin-feed and the frame A, combined with the gears $a^{18}$ $a^{18}$, rack $a^{19}$, and pinions $a^{23}$ $a^{23}$ to move the sliding block $a^4$, and with the cam $a^{22}$ and lever $a^{20}$ to operate the said rack, substantially as described, and for the purpose set forth.

4. In a seaming-machine, the combination, with a forming-cylinder, of the clamps, the toggle-joint, an arm $f$, and cam $f^3$, whereby the clamps of the forming device are opened by pulling down the center of the toggle-joint, substantially as described, and for the purpose set forth.

5. The combination, with a forming device to form the bodies of tin cans and hold the same to be soldered, of a box for holding powdered resin, a rotary roller situated in the lower part of said box for feeding the resin, and adjustable pieces $c^6$ $c^6$, and means for automatically raising and lowering said box, all as set forth.

6. In a seaming-machine, the combination, with a forming device to form the bodies of tin-cans and hold the same to be soldered, of a resin-box to hold a quantity of powdered resin, a roller passing through the lower part of said box and operated by a ratchet and pawl to feed the resin from said box, the adjustable pieces $c^6$ $c^7$ upon the sides of the resin-box, and means, substantially as described, for automatically raising and lowering said resin-box, all substantially as set forth.

7. In combination with a lateral cylindrical former, the movable pivoted arms for inclosing and clamping the perimeter of said former, a vertically-oscillating and substantially horizontally-sliding bifurcated frame disposed above said former, the bifurcation adapted to support a removable soldering-iron, and means for vertically oscillating and laterally sliding said frame reciprocally, all as set forth.

8. In combination with the rotary vertical plate or disk journaled on a horizontal axis and having a series of cylindrial formers or hubs extending from its surface, the movable pivoted arms for inclosing and clamping the perimeters of said formers or hubs, a vertically-oscillating and substantially horizontally sliding and reciprocating frame disposed above said wheel and former, means for rotating the wheel and holding the formers and for stopping said formers under the reciprocating frame, means for vertically oscillating and horizontally sliding said frame reciprocally, and a movable soldering-iron suspended in said frame, all as set forth.

9. The carrying-wheel and the series of forming devices, combined with two soldering-irons $e$ $e'$, of box shape, provided with projecting faces 36, the two arms $e^2$ $e^2$, provided with slots 46, to hold the said soldering-irons with their faces 36 projecting through said slots, and means to move the said soldering-irons both vertically and horizontally, all substantially as described, and for the purposes set forth.

10. The soldering mechanism consisting of a substantially horizontal bifurcated or slotted arm and the removable hollow soldering-iron $e$, adapted to be dropped into and suspended in the slot or bifurcation of said arm, in combination with means for vertically oscillating and longitudinally reciprocating the same, all as set forth.

11. An improved rotating and locking device for a rotating disk, consisting of a sliding frame and mechanism for intermittently sliding said frame in either direction, a latch-pin attached to said frame and adapted to enter sockets in the side of the disk, an oscillating lever $h^3$ parallel with the face of the disk, a loose pin 27 in one end of said lever for entering the sockets in the side of the disk, mechanism for oscillating said lever, and a lever pivoted to one arm of the lever $h^3$ and adapted to oscillate in a direction at right angles with the movement of the lever $h^3$, and with one arm in engagement with the pin 27 and the other arm in engagement with the sliding frame, all as set forth.

12. The combination, with a rotating disk having a horizontal axis and hubs or formers extending laterally from the face of the disk and having longitudinal holes or sockets, of a sliding frame and mechanism for intermittently sliding said frame in either direction, a latch-pin attached to said frame and adapted to enter sockets in the side of the disk, an oscillating lever $h^3$ parallel with the face of the disk, a loose pin 27 in one end of said lever for entering sockets in the side of the disk, mechanism for oscillating said lever, and a lever pivoted to one arm of the lever $h^3$ and adapted to oscillate in a direction at right angles with the movement of the lever $h^3$, and with one arm in engagement with the pin 27 and the other arm in engagement with the sliding frame, all as set forth.

CHARLES W. SLEEPER.

Witnesses:
ALLAN MOYLE,
GEO. S. ROBINSON.